(12) United States Patent
Lehky

(10) Patent No.: US 9,200,434 B2
(45) Date of Patent: Dec. 1, 2015

(54) EXTRACTION OF WATER FROM AIR

(75) Inventor: Pavel Lehky, Zürich (CH)

(73) Assignees: Pavel Lehky, Zurich (CH); Jan Marc Lehky, Zurich (CH); Monique Lehky Hagen, Brig-Glis (CH)

(*) Notice: Subject to any disclaimer, the term of this patent is extended or adjusted under 35 U.S.C. 154(b) by 189 days.

(21) Appl. No.: 13/824,784

(22) PCT Filed: Nov. 9, 2011

(86) PCT No.: PCT/IB2011/002738
§ 371 (c)(1),
(2), (4) Date: Mar. 18, 2013

(87) PCT Pub. No.: WO2012/069901
PCT Pub. Date: May 31, 2012

(65) Prior Publication Data
US 2013/0227879 A1    Sep. 5, 2013

(30) Foreign Application Priority Data
Nov. 25, 2010   (CH) ...................... 0197510

(51) Int. Cl.
*B01D 53/14*    (2006.01)
*E03B 3/28*    (2006.01)
*B01D 53/26*    (2006.01)
*B01D 53/28*    (2006.01)

(52) U.S. Cl.
CPC . *E03B 3/28* (2013.01); *B01D 53/14* (2013.01); *B01D 53/1425* (2013.01); *B01D 53/263* (2013.01); *B01D 53/28* (2013.01); *B01D 2252/2023* (2013.01); *B01D 2257/80* (2013.01); *B01D 2258/06* (2013.01)

(58) Field of Classification Search
CPC ........ B01D 47/00; B01D 47/02; B01D 53/14; B01D 53/1425; B01D 53/1493
USPC .............. 95/149, 210, 211, 230, 231; 96/243, 96/322, 327
See application file for complete search history.

(56) References Cited

U.S. PATENT DOCUMENTS

| | | |
|---|---|---|
| 2,138,689 A | 11/1938 | Altenkirch |
| 2,462,952 A | 3/1949 | Dunkak |
| 3,318,107 A | 5/1967 | Riley |
| 4,146,372 A | 3/1979 | Groth et al. |
| 4,185,969 A | 1/1980 | Bulang |
| 4,219,341 A | 8/1980 | Hussmann |
| 4,285,702 A | 8/1981 | Michel et al. |
| 4,304,577 A | 12/1981 | Ito et al. |
| 4,342,569 A | 8/1982 | Hussmann |
| 4,345,917 A | 8/1982 | Hussmann |

(Continued)

FOREIGN PATENT DOCUMENTS

FR    2 813 087 A1    2/2002

OTHER PUBLICATIONS

Jensen, Merle H., "Hydroponics", HortScience, vol. 32(6), pp. 1018-1021, Oct. 1997.

*Primary Examiner* — Robert A Hopkins
(74) *Attorney, Agent, or Firm* — Harness, Dickey & Pierce, P.L.C.

(57) ABSTRACT

Water vapor is extracted from air in a process in which water vapor from large volumes of air is concentrated by absorption into a small volume of hygroscopic liquid (14), from which it is recovered by passage through a selective layer (12).

19 Claims, 10 Drawing Sheets

(56) References Cited

U.S. PATENT DOCUMENTS

Figure 1:
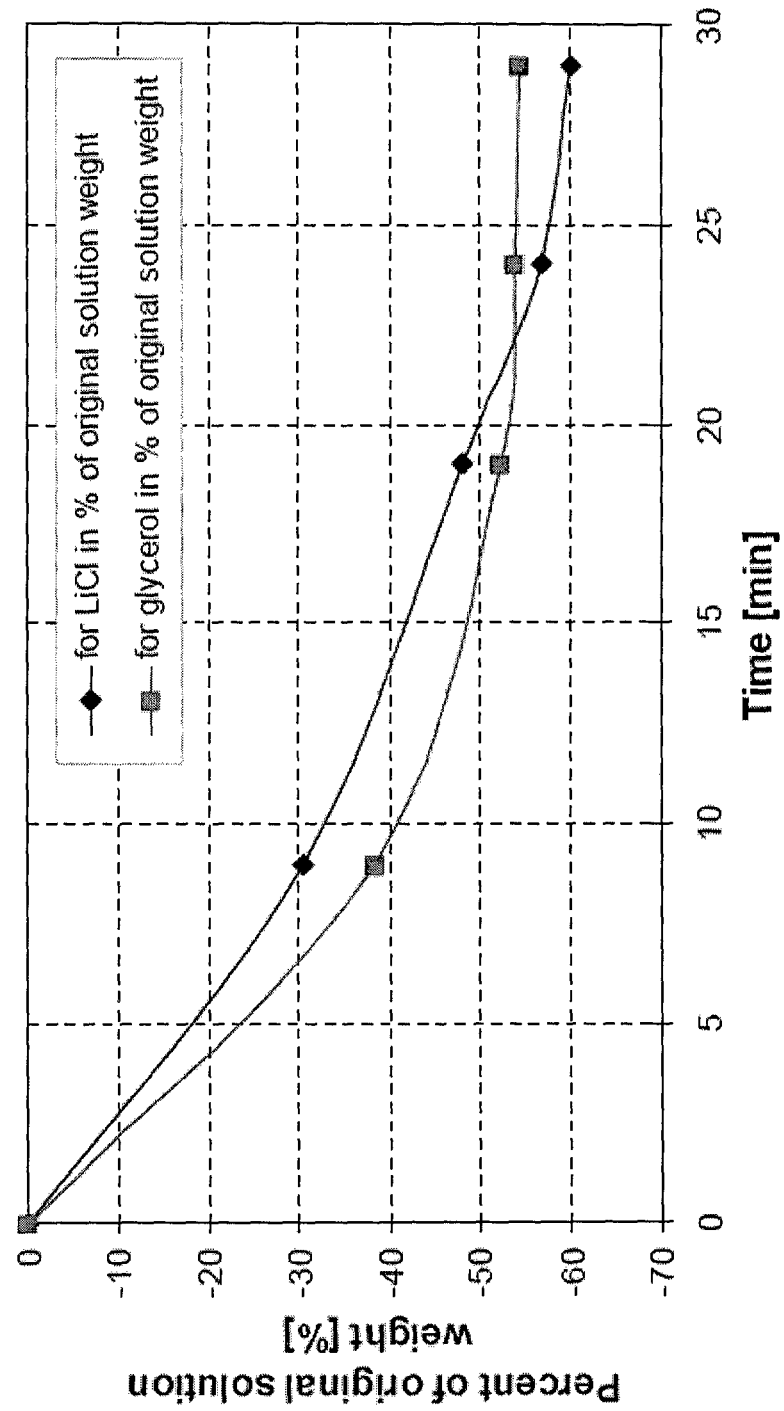

| | | |
|---|---|---|
| 4,374,655 A | 2/1983 | Grodzka et al. |
| 5,233,843 A | 8/1993 | Clarke |
| 6,588,225 B1 | 7/2003 | Hodgson et al. |
| 7,722,706 B2 * | 5/2010 | Thielow .................... 95/211 |
| 2005/0103615 A1 | 5/2005 | Ritchey |
| 2007/0184274 A1 * | 8/2007 | Wheatley et al. .......... 428/411.1 |

* cited by examiner

EXTRACTION OF WATER FROM AIR

CROSS-REFERENCE TO RELATED APPLICATIONS

This application is a 371 U.S. National Stage of International Application No. PCT/IB2011/002738, filed on Nov. 9, 2011, which claims priority to Swizz Patent Application No. 0197510, filed Nov. 25, 2010, the contents of which are hereby incorporated by reference in their entirety as if fully set forth herein.

Supply of quality drinking water is dramatically insufficient in the world. According to official estimations about 1,500 million people on Earth have no drinking water of sufficient quality. Every 8 seconds one child dies because of drinking contaminated water.

There is an urgent need to provide drinking water to humanity, especially in arid regions. To compensate insufficient rainwater, various technologies have been introduced. In coast regions, water is obtained at high cost from seawater by multistage distillation or by reverse osmosis.

Water produced on industrial scale requires high investments into infrastructure and operation as well as into energy. These systems cannot be used inland, where no seawater or brackish water is available. Water from large-scale production must be distributed by a system of pipes, which costs up to ten times more than the production of the water itself. In addition, the water can be contaminated or even partially lost through line breaks or other defects until it reaches the end user. The system is unsuitable for the majority of sparsely inhabited inland regions.

Therefore, there is an urgent need to find an alternative, convenient and low cost source of clean water for humanity. There is a similar urgent need for supply of water for agricultural use.

Air humidity is potentially a very promising source of clean water. This potential is vastly unknown, because people do not realize how immense quantities of water are contained in thin air in form of water vapor. Under normal conditions, a cubic km of air contains enough water to constitute a river 1,000 m long, 15 m broad and 1 m deep. This amount of water (15,000,000 liters) is equivalent to the daily supply of drinking water for 5 million people. There is an unlimited supply of humid air on Earth. Even in dry places, such as the Sahara, with an average humidity of 30% relative humidity (RH), each cubic kilometer of air contains a river 1,000 m long, 3 m broad and 1 m deep! The air humidity is constantly renewed by winds from the oceans and, therefore, cannot be exhausted. Air contains ten times more water than is carried in all rivers of our planet and is an unlimited source of clean water on Earth. All continental water originates from precipitation of air humidity.

Many attempts have been made to obtain water from air. Water in vapor form has a much higher energy content than in liquid form and its condensation is a strongly exothermic process. Recovery of water from air was attempted by cooling, air compression, adsorption on solid adsorbents, absorption in liquid absorbents and many other methods presented in the literature.

Methods using liquid or solid desiccating materials are described for example in U.S. Pat. No. 2,138,689, U.S. Pat. No. 2,462,952, U.S. Pat. No. 4,146,372, U.S. Pat. No. 4,185,969, U.S. Pat. No. 4,219,341, U.S. Pat. No. 4,285,702, U.S. Pat. No. 4,304,577, U.S. Pat. No. 4,342,569, U.S. Pat. No. 4,345,917, U.S. Pat. No. 4,374,655, U.S. Pat. No. 6,588,225; US Pat. no. 20050103615, FR Pat. no. 2,813,087, WO Pat. no. 09966136, WO Pat. no. 106649.

Solar heat is often used for desorption of water. As the evaporation heat of water is 550 kcal per kg, the use of other sources of energy would be prohibitively expensive.

Many inventors try to recuperate the energy in the process. However, this requires additional installations and generates cost increases. Neglected is the mere fact that in places of water scarcity solar energy is amply available at no cost, while financing is not available.

None of the attempted methods succeeded in production of clean water on any significant scale for poor populations. The main reasons are that all tested methods are expensive, complicated, require large investments into infrastructure and energy, give low yields. The end user, especially in poor countries, cannot afford expensive drinking water.

Humanity needs a suitable method for harvesting clean water from air. Such method must be simple and reliable. It should work in decentralized small units for a village or even for families without the need of expensive piping systems. It should not require any fossil energy. It should be easily serviced, even by uneducated people, and constructed on place from easily available materials. In addition, the method should in no way pollute the environment, even in the case of mistakes or accidents. It should not endanger the user even in case of serious errors in the use of the system. The method should be easily understandable for persons with only elementary education. It should be operated on, or close to, the places of water use and in such manner eliminate the need for excessive piping and infrastructure costs.

Surprisingly, we have succeeded to invent such a method and structures which are disclosed herein.

MEANS AND METHOD FOR HARVESTING WATER FROM AIR

The amount of water in air varies according to the conditions from a fraction of a ml to over 30 ml per cubic meter in hot, humid regions. The most efficient way of water extraction is the absorption of the water vapor into a hygroscopic liquid. Such a process occurs spontaneously and does not need any active displacement of large masses of air that require expensive structures and large investments. Liquid absorbers have large water binding capacity and can be easily transferred. They selectively absorb water vapor and not other air contaminants and pollutants.

Under a hygroscopic liquid, any water absorbing liquid is understood. It can be any liquid substance or aqueous solutions of solid substances. Such substances are for example inorganic salts, such as lithium chloride, lithium bromide, calcium chloride, potassium acetate and others. Suitable are also organic substances, especially dihydroxylic, trihydroxylic alcohols such as ethylene glycol, glycerol and others. However, this listing is not limiting the scope of this invention, since many other hygroscopic substances will function as well.

Particularly preferred is glycerol, known also under the name of glycerin. Its IUPAC name is propan-1,2,3-triol. Glycerol is a natural product, which has high affinity for water.

Its big advantage is that it is not toxic—it is actually edible! Glycerol is obtained in huge volumes as waste of bio-fuel production from corn. Therefore, its price is very low. Under optimal conditions, it can bind more than its own weight of water. The speeds of water vapor absorption and desorption are high. Due to the high osmotic pressure of glycerol solutions in its working range, no biodegradation by microorganisms occurs, even after many months of exposition to the environment. Surprisingly, this sweet solution does not attract insects. Another big advantage of glycerol is that in case of spills or accidents, it remains on the surface only until the next rain. In diluted form, it is then degraded by microorganisms in the soil. Spilled glycerol is not a pollutant but is a welcomed nutrient and source of energy and carbon for microbes present in the soil. It is finally biodegraded into carbon dioxide and water. Therefore, glycerol can be used even on very large scale without any danger for the environment.

This is not the case with the frequently proposed lithium chloride and other mineral salts, which after a spill remain in the soil, on which plants cannot grow and after rain, they remain permanently in the ground water as a dangerous pollutant.

To eliminate the need for any costly and complicated movement of air masses, it is preferred to just let air contact a suitable water absorbent on an easily available surface. The air contact is not forced in any manner; just the natural circulation of the air masses, such as air convection and wind, is used.

A convenient air contact surface may be large and easily available. An example of such a contact surface can be the wall of a house, part of the roof, the slope of a hill, the surface of a shallow pond and so forth. The surface should be, if possible, in the shade or be conveniently covered to prevent solar heat to decrease the efficiency of water absorption. A cover is not necessary when water absorption is carried on during the night.

Night absorption is particularly suitable in very dry regions, even in the Sahara, where relative humidity of air can reach 100% and gives rise to spontaneous condensation on cool surfaces. When hydrated solution of glycerol can be conveniently stored, for example in large recipients, tanks, concrete pools, ponds or grooves in the soil and lined with convenient plastic sheets, the water extraction can then advantageously proceed during daytime. Such separation of the water harvesting into two stages presents big advantages according to the specific location of use.

In order to demonstrate and compare the water harvesting power of glycerol and lithium chloride, the following experiment was performed:

4 grams of 50% glycerol or 20% lithium chloride (both concentrations correspond to half saturation of the respective water absorbing substance) were spread on a sheet of cotton fabric of 25 cm×25 cm surface and 0.4 mm thickness and placed in a still air incubator at 60° C. The weight variation was followed as a function of time. The results presented in FIG. 1 show, that water is faster released from glycerol. This is not surprising, because glycerol has lower affinity for water than LiCl.

Then, the above dried sheets were suspended at 20.1° C. in a room with still air and with relative humidity RH of 66%. The weight increase was recorded. Results obtained are presented in FIG. 2. The initial velocity of water uptake is similar in both cases. LiCl absorbs a higher amount of water. It has a somewhat higher capacity. However, it must be mentioned, that at high concentration LiCl has a high viscosity and it could not be used in this state in practical installations.

The speed of water absorption is much lower in stationary air than in wind. Wind increases the water uptake considerably. The amounts of water transported by wind are huge.

Under normal conditions, the amount of water vapor passing through an opened door of about 2 m×1 m at light air movement of only 0.5 m per second for 24 hours, is equivalent to about a volume of 1,300 l of water.

LiCl as well as other hygroscopic salts are very corrosive and this would lead to high corrosion of installations at long term. On the other hand, glycerol is not corrosive and through its water binding capacity it actually reduces corrosion.

Figure 3:
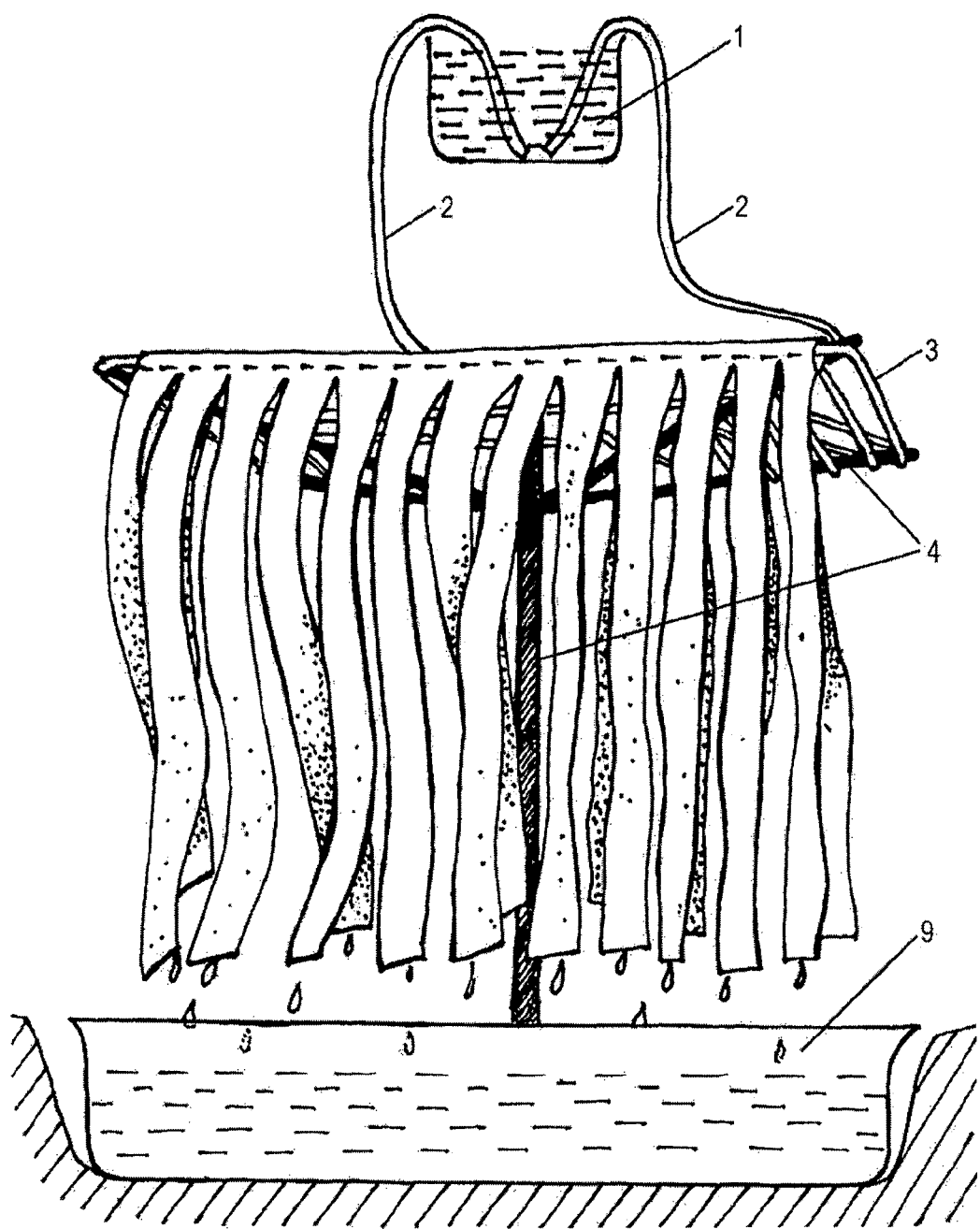

An easy to get absorption device can be made out of common a fold away clothesline, which is widely available and can be obtained at prices below 100 USD or can be easily self-made as shown in FIG. 3. With a 60 m line an absorption surface of 120 m² using a single layer or 240 m² using a double layer can be built with common cloth made of cotton or any other suitable material.

Figure 4:
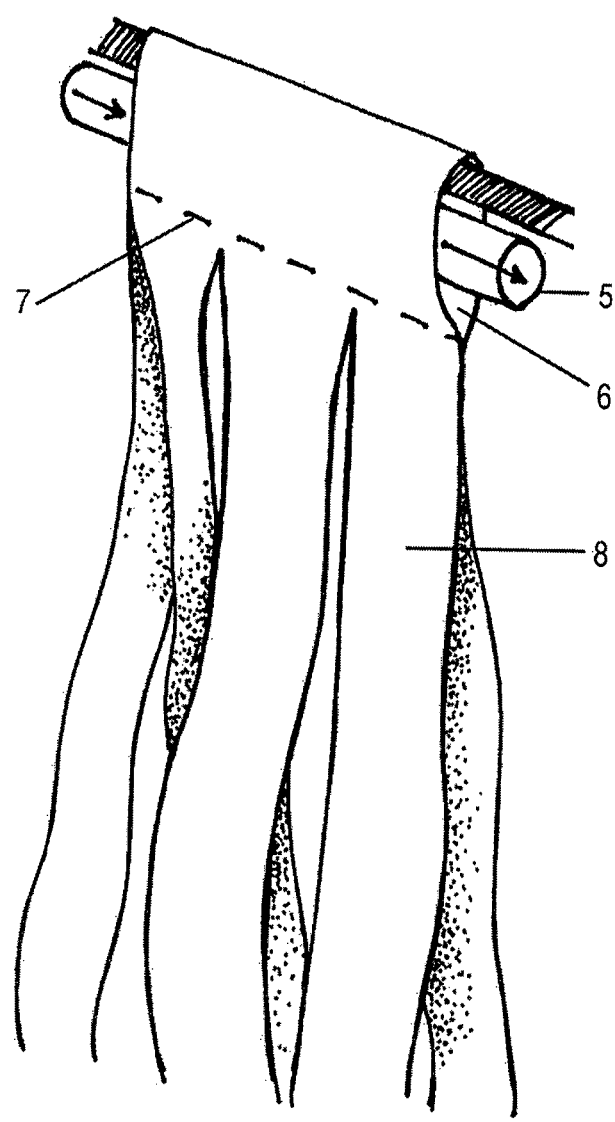

FIG. 3 shows an example of a simple absorbing installation. Concentrated glycerol (about 92 to 99%) in vessel 1, placed at a somewhat elevated position, flows by tubing 2 fixed along lines 3 of clothesline 4. FIG. 4 shows a more detailed view, where the tubing 5 passes through a tubular opening 6 formed by the fabric 8. In usefully spaced distances, the tubing 5 is cut or pierced to allow glycerol to drop on the textile. A slight incision made to the silicone or rubber tubing will form a pressure sensitive opening channel for the glycerol solution. The textile is fixed in position by sewing, pins, clamps or other means 7. It is preferable to cut the textile 8 into strips about 5 to 10 cm broad and 2 or 4 m long. Such strips efficiently reduce forces on the structure generated by wind. Strips are fixed around the glycerin dispensing tubing and hang down in one or multiple layers. The lower ends are fixed to the bottom or central pole by ropes, wires or similar material.

This prevents excessive movement of the textile strips in the wind. Water enriched glycerin solution can be simply collected on a large plastic sheet. The bed of the sheet 9 can be made by removing the soil under the clothes line absorber as shown on FIG. 3. Alternatively, it can be constructed from another material. Convenient beds can be made also from stones or similar cheap material, which can be found on place. Permanent containment reservoirs for hydrated glycerol can be made from concrete walls and bottom. The surface should be treated with a protective layer to prevent penetration of the liquid into the concrete structure and, thus, protect the structure, reduce glycerol losses and facilitate cleaning and service.

There are many obvious ways how to modify these elements to obtain a satisfactory absorption device.

Based on performed small scale experiments it was calculated that under sufficient air circulation even with such a very simple installation with an absorption surface of 120 m², using a single fabric layer, about 250 l of water can be harvested in 24 hours and, in a double fabric layer version, about 500 l of water can be harvested. This can cover the drinking water demand for a community of 100 to 200 persons.

The lines can also be fixed in many other ways. For example, they can be fixed between walls, houses, trees, wooden or metal poles, rocks and so on. Each time the liquid collecting trench must be provided by suitable watertight linings.

Much larger water harvesting structures can be made by many different means, which are adapted to local conditions and are easy to conceive by those skilled in the art.

It is clear that the stage of absorption of water in glycerol can be achieved at very low costs with extremely simple devices. Persons without any special professional education can easily build them.

The main cost factor will probably be the absorbing textile. A new convenient cotton fabric or plastic textile can be obtained at a cost of few USD per square meter. However, only stripes of it are required, therefore, it can be made from adapted used or recycled textile, which will have only negligible cost.

Lines, tubing and plastic sheets for linings are typically low cost commodities available everywhere. Permanent absorption structures can be made from steel or stainless steel nets.

Many different lining materials can be used. It could, for example, be a sheet of polyethylene, polypropylene, polyethylene terephtalate (PET), PVC, polycarbonate, polyamide, PTFE and similar fluorinated materials, conveniently impregnated woven or nonwoven textiles, impregnated paper and so on. Thin sheets of metal are obviously also usable. The material of lining sheets is not important. It should only have the necessary mechanical stability and should provide a surface, which is tight to prevent the loss of water-glycerol solution. When the containment of hydrated glycerol is met by other means, the lining is not necessary at all.

The second cost factor is the price of glycerol, which is presently around 1 USD per kg of 99% pure substance. However, pure isolated glycerol is not needed and crude 50 to 80% product has almost zero price. Glycerol in ton amounts picked up at the plant has been offered for 0 to 70 USD per 1,000 l in the U.S.A. The resulting price will depend essentially on transport costs to the place of use. Glycerol is a byproduct of several chemical processes, for example in soap production, and can be frequently obtained from local sources.

Large amounts of glycerol are used in food production (pastry, sweets, drinks). Glycerol is also generally used as a good hydrating agent in many cosmetic products and is, therefore, broadly available.

A big advantage of water absorption into glycerol is its high selectivity. In refrigerated condensation systems, the majority of air contaminants such as aromatic substances, microorganisms, dust and other pollutants are condensed all together with water. In the here disclosed system, glycerol, due to its high selectivity for water molecules and its hydrophilic character, minimizes the absorption of air contaminating hydrophobic molecules. The high selectivity of glycerol for water is the warranty, that the recovered water will have a high degree of purity.

In refrigerated condensation systems, water quality is similar to a condensate of local smog and such water must, therefore, be additionally purified.

Recovery of Water from Hydrated Glycerol Solution

Known inventions for winning of water from air are considerably complex and expensive structures requiring much energy and complicated equipment. The technology according to this invention is very simple and low cost. It can be constructed from locally available materials and does not require any special formation and knowledge to run and service it.

Figure 5:
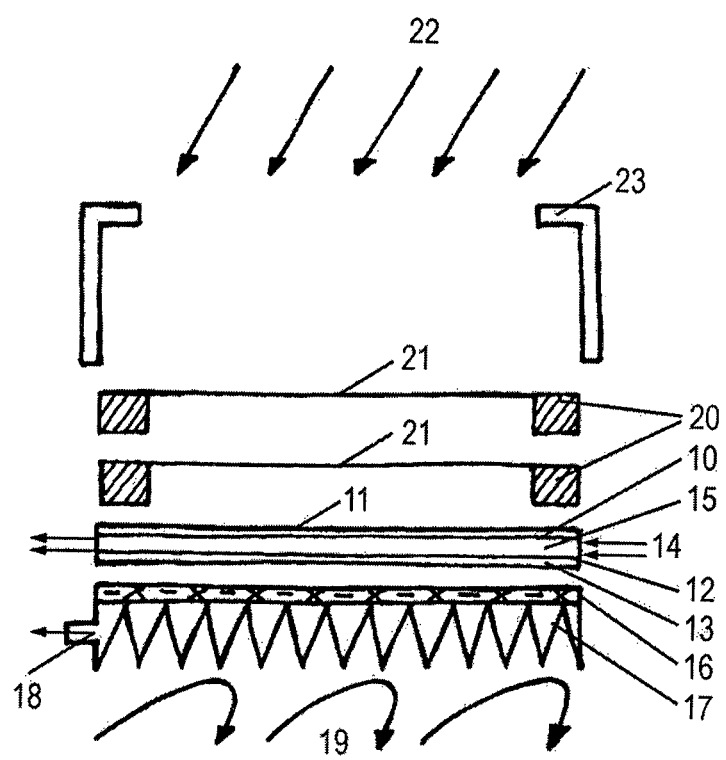

The key component is a sandwich structure shown in FIG. 5, which is formed by a heated sheet of heat conducting material 10, for example a thin layer of metal such as aluminum, copper, steel, stainless steel or others, which is provided on at least one side with a light absorbing layer 11 to efficiently transform solar energy into heat. Such light absorbing layers can be made for example by a layer of black carbon varnish supplied in many spray or color formulations available on the market. Chrome black layer is known for its very high light absorption. It is a good light absorbing layer with a very low light emission. Modern composed layers of light absorbing metals such as TiNOX®, available on both, aluminum and copper, are produced by Almeco-Tinox GmbH, Munich, Germany.

Cheaper and quite satisfactory light absorbing layers can be obtained simply by spraying black, preferably matt, varnishes widely available. Preferred is a very thin sheet of metal with a thickness from 0.05 to about 1 mm. Thin sheets have the advantage of high rates of heat transmission and low cost. However, thin sheets are not mechanically stable and, therefore, the preferred sheet thickness is between 0.1 to 0.5 mm. Sheets of non metallic materials can also be used. In a thin layer the somewhat reduced heat conductivity does not present a major obstacle to the heat transfer.

On the lower side of the sandwich structure is a layer of material 12, which is permeable to water and/or water vapor, but totally impermeable to glycerol. Here, it is also called the glycerol barrier. A complete rejection of glycerol in the case of a cellophane membrane and its good permeability for water has been described in scientific literature (Biswas et al. (2000) "Dehydration of Glycerol-Water Mixtures Using Pervaporation: Influence of Process Parameters", Separation Science and Technology, 35:9, 1391-1408).

One such material is for example a thin layer of cellophane of a thickness between about 2 to 200 microns. Preferred are sheets with a thickness between 5 to 25 microns. The thinner the layer the better, however, care must be taken as to the mechanical stability of such a cellophane barrier membrane. In order to increase stability, the membrane can be supported by another material 13, which does not need to block the passage of glycerol. Among suitable materials are various woven and non-woven fabrics, felts, porous membranes made of various polymers, such as a thin layer of open pore polyurethane sheets. Suitable support materials are also stabilized fibrous glass layers, filters, thin mats, which are commercially available from many suppliers.

Aside of cellophane, also other membranes, which block the passage of glycerol but let water molecules pass through, can obviously be used. Examples are derivates of cellulose, such as acetylated celluloses (for example cellulose triacetate). Other materials known as efficient membrane materials in reverse osmosis, such as polyamides, can also be efficient.

Suitable membranes for this purpose are for example ePTFE layers on polyester substrates such as Tetratex® 6538 1.5 micron membrane or 6536 1 micron membrane produced by Donaldson Filter Components Ltd, England.

Also easily made are selective layers consisting of various fabrics, which are made hydrophobic or even super hydrophobic by a treatment. Many types of water proofing sprays for fabrics, clothes, shoes, leathers and so on are easily available. Suitable fabrics are produced on large scale for clothing by several firms such as GORE-TEX®, Sympatex® and others.

The crucial property of the glycerol blocking layer is that it does not allow the liquid phase to enter into the hydrophobic structure of the material, but water in vapor form can freely pass through it.

Alternatively, it is possible to make originally non-hydrophobic materials hydrophobic by chemical modification of their surface by suitable methods well known to those skilled in the art. As an example is mentioned the permanent hydrophobization of various material in filamentary or fabric form by treatment with methyltrichlorosilane and other substituted active silanes as described in (US patent application Zimmermann et al.—US 2007/0264437 A1).

Yet another possibility is coating of the surface of porous separating layer by polymerized substituted or unsubstituted paraxylene (also known as Parylene®) as described in U.S. Patent Application US 2002/0189455 A1. Such coating is durable, inexpensive and both hydrophobic and oleophobic. It can be produced on large scale.

Also suitable is a layer of hydrophobic, nanostructured silica, which is produced on large industrial scale. An example is Degussa fumed AEROSIL® R974. In compacted layers it has excellent isolating and liquid barrier properties while providing high permeation rates for water vapor.

The invention here presented is not limited to the above presented examples of membrane selection and modification since any other layer, which allows a separation of water from hydrated liquid will be efficient in the described system.

The glycerol blocking layer plays also a role of heat isolator. When diffusive heat loss is prevented, higher temperatures of hydrated glycerol solution can be attained. This results in an increased evaporation and water production rate.

The solution of hydrated glycerol 14 flows between the heated layer and glycerol-blocking layer. To make the flow regular through the entire available space, without formation of channels and streams, the intermediary space is filled with a layer of filamentous or porous material 15. Good distributing properties are obtained with rather thick fabrics of velour type or other loosely woven fabrics, which have a large void volume.

Non-woven felts made of glass or plastic filaments are convenient. Essentially any material allowing relatively free flow of liquid and strong capillary action is suitable. Preferred here are strongly hydrophilic materials such as hydrophilic cotton of similar quality such as cotton used in medicine for covering wounds. Many fabrics made of synthetic fibers can be made hydrophilic. This increases spreading of the solution evenly on and between both sides of the sandwich structure.

The glycerol blocking layer is either in direct contact or indirectly, through the isolating support layer 16, with the cooler surface 17.

The cooler surface 17 is preferably formed by a thin pleated sheet of metal on which the saturated water vapor condenses and flows out by gravity or pumping action through a suitable pipe or tubing 18 into the pure water container. Different metals and even non-metals can function as a cooler surface. It is essential that it is in contact with the glycerol blocking layer and tight, otherwise, water vapor could escape to the environment and the productivity of the system would be diminished. Condensed water then flows from the condenser into a container vessel. The water container should preferably be placed at a lower level under the sandwich structure (e.g. buried in the soil). The column of outflowing water will, by its hydrostatic pressure, decrease the pressure in the condenser. This will increase the flow of water vapor through the glycerol blocking layer and slightly decrease the boiling point of water, thereby increasing the concentration of water vapor at equilibrium at a given temperature. On the other hand, when the container is buried in the ground, the obtained water will be kept cool during storage.

The decreased pressure in the sandwich structure allows the external air to press on the sandwich structure and, therefore, keeps all layers together without any other mechanical means. The flow of hydrated glycerol on the other side of the glycerol blocking membrane should be equally kept under somewhat reduced pressure by restraining the inflow of hydrated glycerol. This prevents the blowing up of the module and the formation of excessive pressure on the glycerin blocking layer.

The cooler 17 can be made from structures of different forms. The one presented in FIG. 5 is only one of many possible forms and is not limiting the scope of this invention.

The cooling occurs through contact with ambient air or wind 19 in the natural environment. The temperature on the external cooler surface will naturally be lower than the temperature of the heated surface and, therefore, the water condensation will occur efficiently. Most of the time there will be sufficient air movement around the cooler through wind and even without wind natural thermal convection will provide sufficient removal of the condensation heat. The cooler side will always be in the shade of the upper parts of the described sandwich structure. This way of proceeding is very economical compared to other methods with forced circulation of cooling air.

It is advantageous to increase the temperature of the heated side by providing one or more isolating layers as shown in FIG. 5.

Isolation effect is obtained by providing at least one or more compartments with restrained air convection and circulation. In the simplest form such a compartment, consists of a frame 20 covered on the upper side with a sheet of transparent material 21. Such material can be a sheet of glass or a transparent plastic sheet or film. Glass is mechanically stable and a more durable material, however, it can be easily broken and is rather expensive. There are many types of transparent plastic films, which can be used instead of glass. The material should have acceptable stability to solar radiation and be as transparent as possible.

Suitable film materials are polypropylene, polyester, polyethylene terephtalate (PET), polycarbonate, fluorinated materials such as fluorinated ethylene propylene (FEP) and many others. It depends on specific local conditions which material will be the most suitable. Also a combination of a glass layer on the front and a synthetic film in the second isolating layer may be suitable. Glass in this case gives better mechanical protection and allows easy cleaning, if necessary, while a plastic film has low cost. There is a certain compromise, which must be reached. Each isolating layer brings an increase in the efficiency of isolation, but, at the same time, decreases the yield of solar radiation 22. The most advantageous solution will in many cases be just one to three isolation layers. It is understandable that the system will work also without any isolation, but the water yield will be lower. A cost and benefit analysis must be made before final decision.

All described parts of the structure and process disclosed here can be conveniently placed into a frame 23, which will provide the necessary mechanical stability. However, other solutions can also be foreseen.

When other sources of energy are available, for example electric power from solar panels or energy from other sources, they could also be used. In this case, shown in FIG. 6, a heating spiral 24 of suitable power is fixed above the heated sheet or even integrated into the heated surface. For prevention of heat losses, this heater will be isolated by a suitable isolating layer 25.

Heat can, alternatively, also be supplied by hot water produced by solar or other heat sources. For example, hot water can be very cheaply produced by black double layer mats placed on roofs, hillsides, stones, sand dunes and the like. Between two layers of black plastic films exposed to the sun, temperatures of over 100° C. can be obtained. This can, therefore, represent a welcome, cheap and abundant source of energy for the recovery of water from hydrated glycerol.

Figure 7:
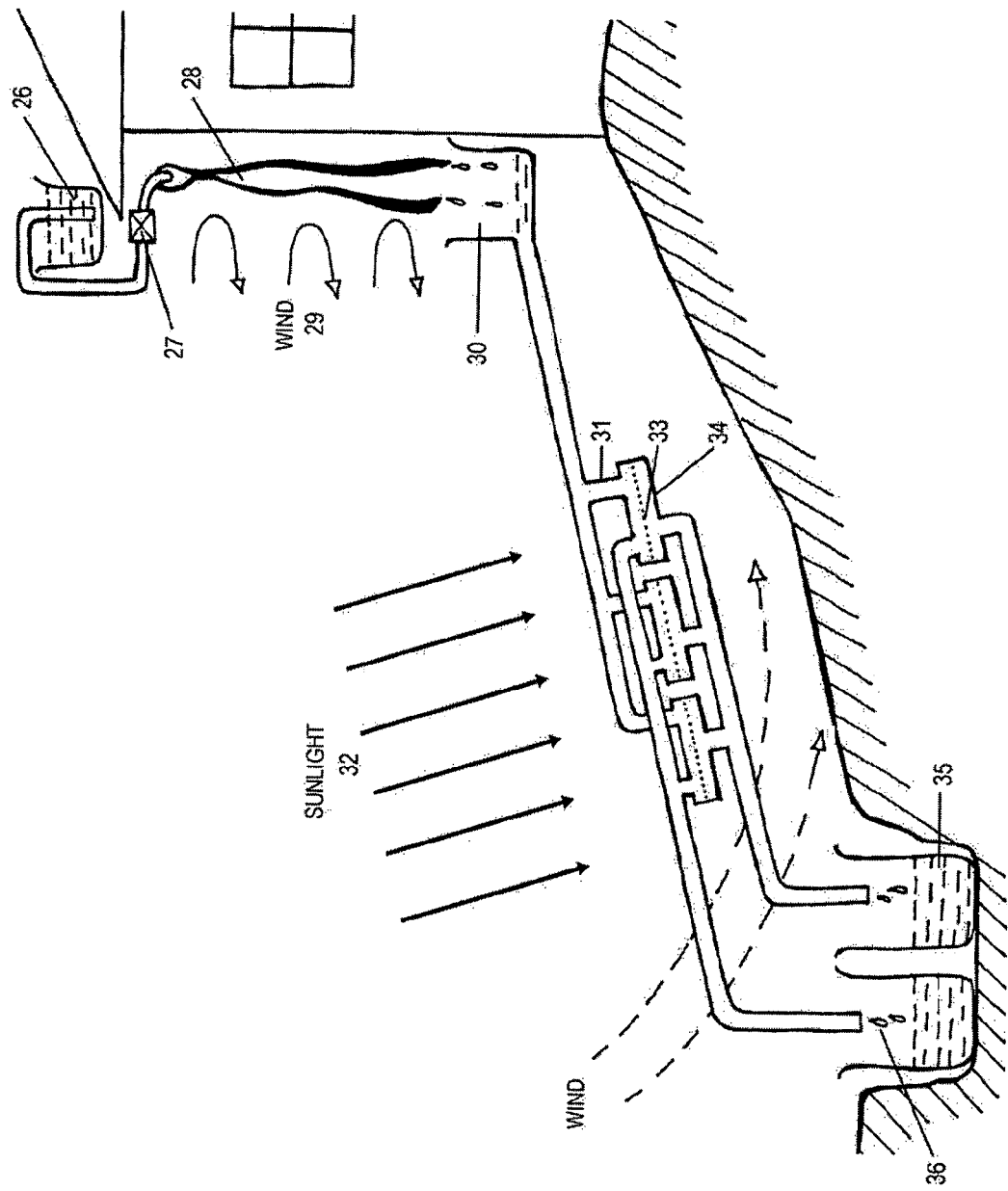

A schematic presentation of one possible configuration of the invention disclosed here can be seen in FIG. 7.

A vessel with concentrated glycerin solution with around 95% of glycerol 26 is placed on an elevated position somewhere (for example on a roof). Glycerol is allowed to flow by controlled flow rate regulated, e.g. by a clamp or valve 27 on sheets of fabric 28 as described also in FIG. 4.

During flow, glycerol takes up water from air humidity brought by wind or air convection 29 and drops into a container 30. From the container the hydrated glycerol flows by gravity or pumping into the previously described water separation structures 31. The glycerol solution is heated, e.g. by the sun 32 to a temperature which can attain 80° C. or even more. This forces the water contained in the hydrated glycerol solution to evaporate. Vapor passes through the glycerol blocking layer 33 and condensates on the cool surface of the condenser 34. From the condenser the condensed water flows into the pure water collection vessel 35.

The concentrated glycerol solution flows from the water separation module 31 and is collected in a container 36. Then it is transferred back into the vessel 26, either manually or by a pump.

Where cheap labor force is present, there is no need to make further additions to the system. However, it is apparent, that all flows can be highly automated and controlled using pumps, valves so that human attention is not necessary. In combination with detectors of sun radiation, temperature and humidity meters and anemometers the system can be very efficiently automatically regulated and its output optimized using microprocessors and convenient programs. This increases running and service costs, but saves working hours of personnel.

Compact Integrated Water Recovering Module

Figure 8:
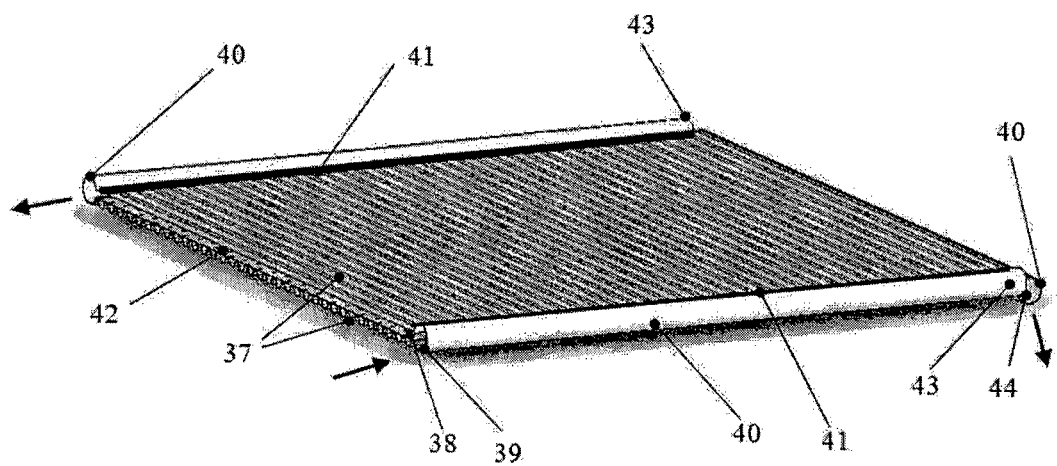
Figure 9:
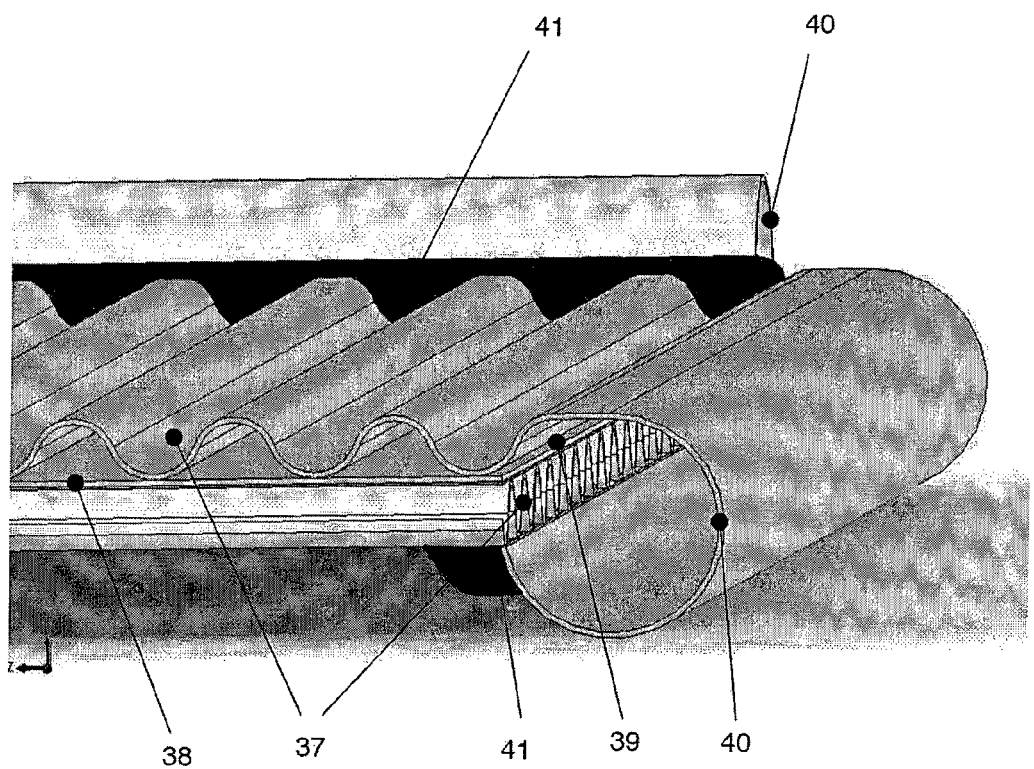

A further possible embodiment according to this invention, as shown in FIG. 5, can be achieved by a water recovering cassette structure as presented in FIGS. 8 and 9:

A sandwich element is formed by two sheets of metal (for example an aluminum sheet of 0.1 to 0.5 mm thickness), on which longitudinal, preferably sinusoidal grooves 37 have been formed. The internal diameter of the grooves can be selected in a broad range. In the present example they have an internal diameter of 1.5 mm. The final dimensions of such grooved plates can be for example 50 cm×50 cm.

Grooves can be easily made by passing a sheet of metal between two cylinders on which opposite tooth profiles have been machined. The tooth profile runs parallel to the cylinder axis. Convenient profiles are usually machined during serial production of gears or tooth wheels and are well known to those skilled in the art.

It is understood, that profiles of different shape (for example parabolic or triangular) and form can be utilized within the scope of presented invention. It is also possible to use a flat metal sheet and form channels by other means on the internal side of the module.

An undulating surface is particularly suitable, because it gives minimal resistance to the flow of the hydrated glycerol and the flow of condensed water. Such a structure also efficiently eliminates air bubbles, should they form at the beginning or during the process of dehydration.

An undulating surface conveniently increases the absorption of solar radiation by limiting its reflection, especially at low angles of sun rays. The heat transmitting surface is also increased and the heat transfer is higher than in flat structures. Undulation also considerably increases the mechanical stability of the surface in the sense of the grooves and, thus, less material is needed to attain the same rigidity of the sheet.

The grooved sheet is fitted with a glycerol blocking membrane 38, which is glued at both extremities 39 of the grooved sheet as shown in FIG. 8 and in detail in FIG. 9. The ends of the grooved sheets are formed into tubes 40 and are sealed 41.

The first and last grooves on each grooved sheet 42 are also glued to prevent leakage of both hydrated glycerol and condensed water in the assembled structure.

Silicone tubing of convenient diameter (not shown) are glued into both tube extremities 40 of the lower grooved sheet and form the inlet for the hydrated glycerol solution which enters at one side and the outlet for the concentrated glycerol that flows out on the other side.

The opposite unused tubular openings 43 can also be sealed by e.g. a silicone glue. Any type of glue, which has good adhesion to the metal structure, can be used. Common silicon glues, such as those used for sealing of glass sheets of windows, aquariums, sanitary equipment and the like, are preferred.

Just two openings are required for the glycerol input and output and one output opening for the condensed water. However, it is also possible to glue silicon tubing into all tubular structures and clamp them. They could be then, for example, used for cleaning or purging the module, if necessary.

The glycerol containing solution flows in the grooves, which are formed by the upper sheet of grooved metal foil, with grooves oriented perpendicularly to the grooves of the lower grooved sheet and which is fixed and sealed into the round tubular edges of the lower grooved sheet. The sealing is made in such a way that both compartments formed by the two grooved metal sheets, separated by the glycerol blocking membrane, are not communicating and are also closed towards the outside space.

The described configuration of two grooved sheets, having grooves perpendicularly to each other, creates two sets of open channels and significantly increases the mechanical stability of such a sandwich structure. Just below the surface of the upper black grooved plate, illuminated by the sun, flows the glycerol solution and in the lower space, below the glycerol blocking membrane, and in grooves, perpendicularly to the grooves of the upper grooved plate, flows the condensed water. It leaves the structure by an outlet tubing (not shown) glued into the round shaped tube 44.

In a preferred embodiment the module is fitted by frames on which heat isolating elements, similar to those in FIG. 5, are fixed. Those skilled in the art will see many different possibilities of doing so. Integration of the described sandwich structure into frames with heat isolation layers makes the system mechanically strong. On the other hand it also makes the described structure ready for separate use.

Figure 10:
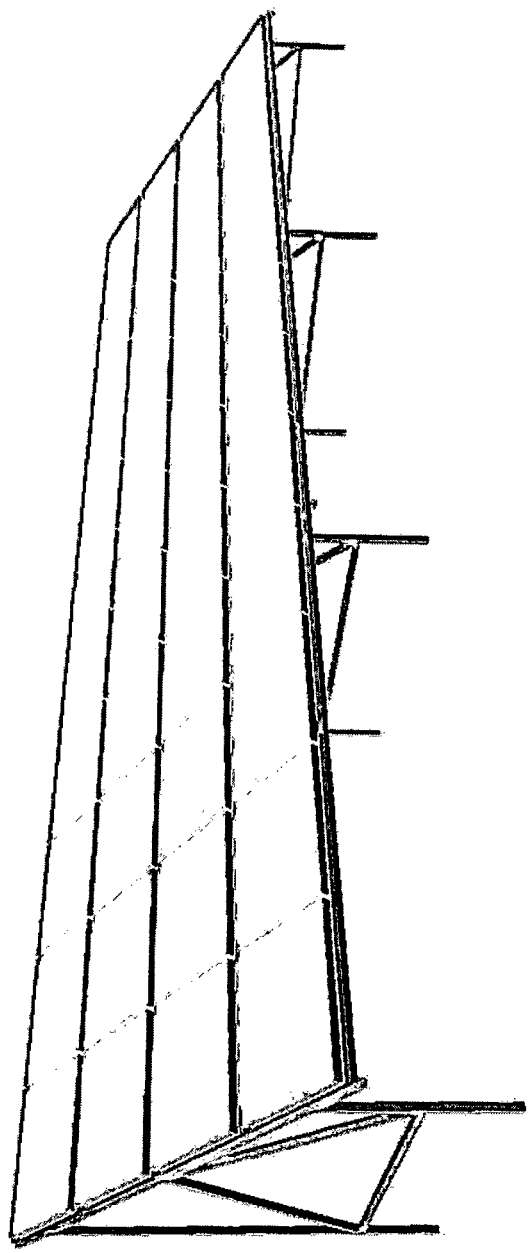

Many such mechanically reinforced cassettes can be placed on metallic constructions similar to the one presented in FIG. 10. In this example 48 modules are placed next to each other. This provides a considerable water producing capacity.

As described earlier, also the sandwich system should be operated under slightly lower pressure than the air pressure of the environment. This naturally pushes both sides of the sandwich together, so that no supplementary supporting structures are required. A convenient pressure difference can be easily achieved by variation of the hydrostatic pressure by means of level setting between the input and output channels. This is obvious and well known to those skilled in the art.

Productivity with an Unoptimized Module Under Laboratory Conditions

Based on the energy supplied by the sun per square meter of surface, the maximal amount of water produced per 10 hours should be about 14.4 l. In reality, this number will be lower. Under artificial laboratory conditions the water yield achieved during ten hours in a not optimized system was 7.8 l. The expected yield will be lower, especially if the system is stationary and does not follow the sun trajectory. Sun following systems are available, however, since the surface costs in arid regions are generally very low, it will be more economical to increase the water producing panel surface in order to compensate for the loss of sun energy by not following the sun trajectory.

Drinking Water Just on the Place of Use Harvested from Air by Here Presented Structures Harvesting of drinking water from air by structures according to this invention solves several major problems at the same time:

- it provides drinking water even on places where no other water supply is available. This allows access to new regions, which could not be inhabited before.
- it covers local demand of high quality drinking water for large rural populations of the world. Consequently, it decreases high mortality resulting from the drinking of contaminated water.
- it provides the highest water quality, due to combination of two highly water selective steps, the hydration of glycerol and the distillation process. This eliminates efficiently chemical, mechanical and bacterial contamination.
- it does not require long distance water supply piping, which are prohibitively expensive in poor countries and are difficult to maintain clean and need expensive maintenance and repairs.
- it is inexpensive and has only uncomplicated service requirement
- it is innocuous for user and environment Unless the system is broken, it should in principle supply uncontaminated water in a quality not obtained by other methods. Defects and leaks in the system are easily recognized by the sweet taste of glycerol mixed with pure water on the water output hose. Even in such a case the drinking water is not dangerous for the user. The danger of a subsequent microbial growth in such water is similar to other sweet drinks in open bottles.

The fact, that drinking water produced by the here disclosed system, does not contain dissolved salts is not a disadvantage for the user, because these microelements are normally supplied in large excess in food. This is confirmed also in "Guidelines for Drinking-water Quality" Vol. 1, 3rd ed., 2004 of the World Health Organization.

Agricultural Use of Water Extracted from Air by Here Presented Structures

Since the system according to this invention is very simple and provides clean, salt free water at low cost, it may also be used as a source of water in agriculture. Calculations with a mean productivity of 5 l water per square meter of the disclosed panels, give an annual rainfall equivalent of 1,825 mm/m². This corresponds to the rainfall quantities of very rainy regions on Earth. Many crops can grow in places where the annual rainfall is less than 500 mm. Therefore, each square meter of water producing panel according to this invention is able to irrigate several square meters of fields. If the extracted water from air will be supplied in addition to the rainfall of the corresponding region, then the surface of cultivable land per square meter of panel will increase even much more.

Typically, plants use less than 3% of supplied water for their metabolisms. The vast majority of water, practically all surface water, evaporates into the air and is of no major use for the plant.

Therefore, no irrigation should be made on the surface or near the soil surface, but, if possible, below than about 30 cm under the surface. There, it will be available to the roots of the plants and it will not be lost directly into the atmosphere by evaporation.

Plants use a lot of water for transpiration. Plants are exposed to intense solar radiation; nevertheless their leaves must be kept at a physiologically admissible temperature. Plants use water to prevent an excessive heating of their leaves. They evaporate water through stomata on their leaves. Due to its huge heat of evaporation, about 550 kcal/l, water provides an exceptional cooling effect, which keeps the leaf temperature in an admissible range.

Living organisms can survive only in a suitable temperature range. If, for example, the temperature of our body exceeds 43° C., we will die. Even though the maximal tolerated temperatures in plants may be higher, the same general principle applies. Above a certain temperature, proteins and other essential components in living cells are denatured and the cell dies. The duration of such fatal overheating may last only minutes, with irreversible consequences. If the plant should survive, cooling water must be available, at least to some extent, without interruption.

There are huge landscapes with sufficient rainfall, but which are unfertile, because the rainfall is very unevenly distributed. During dry periods, plants cannot control their temperature and die. Plants dry out and the vegetation disappears.

The situation could change radically, if even a small amount of water and nutrients would be available during the critical periods. This would allow the plant to survive.

To this effect, water obtained from air could be distributed in the soil at a depth of about 50 cm by a system of low cost pierced tubes made of convenient material, for example polyethylene and the like. A major advantage is also that, in contrast to blocking of such tubes by salts and impurities in common irrigation water, no blocking occurs in the case using the here disclosed method, because the water extracted from air is free of salts and other impurities.

An optimal arrangement of such a water from air irrigation system would be for example a stripe of water providing panels followed by a stripe of irrigated field. Such an arrangement will eliminate the need for long tubing lines and allow air-cooling of the downsides of the panels.

Water absorbing surfaces could also be placed close to or underneath of the panels. There are different options to choose from, which can be easily made and are well known to those skilled in the art. One important advantage is that, due to the simplicity and technical easiness to construct and service the invented system and structures, local population will not have any problem to understand it and adopt it. The transfer of the dehydrated glycerol can be made either manually or by pumps, if solar cells, windmill generators or other sources of electric power are available. Many suitable pumps are available on the market in a large variety of sizes and pumping capacities.

On irrigated surfaces it should be possible to cultivate for example olive trees, vine plants or other cultures. This means that large surfaces, where nothing except maybe perennial grasses can grow just now, would become cultivable.

In addition to the supplementation of a continuous water supply by the here disclosed invention other appropriate measures can be taken for limiting the evapo-transpiration of the plants. For example shading may further strongly decrease the water demand of plants for cooling by transpiration. Possible measures, such as shading of cultures by strips or bands of foils placed above the culture for reducing solar heat, are possible today at low cost and are well known to those skilled in the art.

A large scale use of the here proposed possibility of easing temporary rain deficits by the presented invention, will transform vast unused land surfaces into green farm land. As can be seen, this process has the capacity to solve not only today's water shortages but also provide additional animal and human nutrition in future.

A major advantage of the disclosed method is that water produced from air does not contain even trace amounts of salts and, thus, there is no danger that accumulated salts from irrigation water will, eventually, make the soil infertile.

Another very positive feature of the disclosed process is that the supply of water is continuous on a daily basis. This will certainly help plants to survive also periods of draughts and, therefore, will positively change the landscape. Large regions of the globe may, as a consequence, become inhabitable.

Use of Water Harvested by Means of Structures and Procedure Presented Here for Soilless Cultures The largest future benefit of water obtained by structures and methods described here is expected in soilless cultures. Soilless cultures represent a modern way of growing plants in environments, which would be totally inadequate for classical cultures. Soilless cultures are also known as hydroponics. In soilless cultures, plants are grown with roots placed in rather small closed containers into which water with dissolved nutritive salts is added in a controlled way. Plants are not limited by water and nutrition and, therefore, they grow much faster and produce much higher yields than classical field crops.

As described by Merle H. Jensen in Hortscience, vol. 32(6), October 1997, one tomato plant growing in a container of just under one liter of volume produced 12.8 kg of high quality tomatoes over a six month period. Those skilled in the art know different types of soilless cultures. An introduction to this topic is available on the Internet: http://en.wikipedia.org/wiki/Hydroponics. The information contained there is incorporated here in its entirety.

Two chief merits of soilless cultures are much higher crop yields and the fact, that it can be used in places where in-ground agriculture or gardening are not possible. Soilless cultures require as little as 5% of the amount of water needed on a regular farm to produce the same amount of food. In addition, the required nutrition is reduced to about 25%. Therefore, soilless cultures are perfect for regions with rain deficiency.

Furthermore, arid regions generally get more than twice the amount of photo synthetically relevant solar radiation compared to Central Europe or Northern U.S.A. Therefore, they are even more suitable for soilless cultures.

The production of pure water from air according to this invention, on places where no other water source was available up today, opens totally new and huge perspectives for production of food in unfertile arid areas of the planet. Consequently, the here disclosed invention can contribute not only to the elimination of scarcity of drinking water, but can open a new unexpected source of food! Large landscapes may become inhabitable for the growing world population.

Major improvements of growth conditions of plants in general, but especially those cultivated in soilless conditions with irrigation means according to the structures disclosed here, may be achieved by shielding of plants by specific filters, which allow the transmission of only the part of the solar radiation spectrum which is essential for plant growth and photosynthesis. This means that only the red part of the spectrum will pass through such a filter layer and the radiation of other wavelengths will be reflected. Such a filter will dramatically decrease the amount of water needed for transpiration, which plants need to regulate their temperature. On the other hand, photosynthesis will not be impeded and the growth rate will be maximized. Without any doubt, this will be positive for the increase of the yield of the crop. Increases of harvest by one order of magnitude have already been observed in soilless cultures (for example in the production of tomatoes). The selective shielding can improve it even more as the same amount of water can be used for more plants.

Today's technology allows producing thin films from different materials in large amounts and at very low cost. It is possible to produce films so compounded that they will have the optical properties as described above. The methods how to achieve that are well known to those skilled in the art. An introduction into the field may be obtained on the Internet http://en.wikipedia.org/wiki/Filter (optics). The content of this page is enclosed here in its entirety.

Another interesting possibility of production of filters with suitable optical properties is providing the surface of the film by dichroic layers with suitable reflection characteristics. They are broadly used for production of so called cool beam lamps. The application of submicron layers of different materials produces diffraction in such a way that some parts of the spectrum are reflected and some pass through essentially without hindrance. Dichroic layers are known from the colorful plastic films used for fancy packing of presents etc.

The production of dichroic layers is known to those skilled in the art. Introductory information into the field of dichroic filters can be found on the Internet on the page http://en.wikipedia.org/wiki/Dichroic filter. The content of this page is enclosed here in its entirety.

Use of Presented Structures and Method for Alleviation of the Green House Problem Caused Inter Alia by Increased Atmospheric $CO_2$ Concentrations Large scale use of the here presented method and structures, which provide clean water from air simply and at very low cost, may bring an unexpected solution to the green house effect, attributed to the increasing concentration of carbon dioxide in the atmosphere.

It is a well known fact, that plants absorb solar light preferentially in the region of the absorption spectrum of chlorophyll. Plants do not significantly absorb radiation in the invisible infrared part of the solar spectrum. This part of spectrum represents about one half of the solar energy reaching the Earth's surface. This is readily seen on pictures of vegetation made by IR cameras. The vegetation appears snow white, which demonstrates almost total reflection of this part of solar spectrum. Plants reflect also large portions of light in green color and partially also of blue and yellow light, which also appears as green to our eyes.

Due to this property, plants reject large portions of solar radiation, which would otherwise be transformed into heat on the ground. The resulting increase of temperature in the environment will vaporize ground water and heat air above it. Consequently, the amount of precipitation will decrease and the region will become drier and eventually unsuitable for further plant growth. The end result could be a desertification of such area.

To cope with the increasing temperature on the Earth, certain scientists and politicians want to reduce the concentration of carbon dioxide in the atmosphere. Such task is difficult and expensive. It is known that carbon dioxide is the only and unique carbon source of all our food, because $CO_2$ supplies all carbon atoms in sugars, greases, proteins, shortly in all biological molecules, which are essential for our life.

The new structures described in this patent application and the method of their use allow for the first time to get water on places where it is not available or only in limited amounts.

The water can be utilized for growing plants, which function as a biological reflector of excessive solar radiation and at the same time as a shield, which protects the humidity of soil from evaporation. Humidity used by plants for transpiration and cooling of their leaves also decreases local temperatures. In a chain effect the air above such region will be cooler also and more likely saturated with water. This will lead to more frequent precipitations. This again in positive feedback will promote plant or crop growth in the region.

If this process is carried on places, which are close to the break-even point of rain deficit, a relatively small but constant water supply may reverse the negative climate change and make the region green again. There are many such places on the border with arid regions. Here such processes should start.

The end result would be the decreased overall temperature. At the same time, large surfaces of the globe could be used for crops and supply nutrition and living space for millions of inhabitants.

While various embodiments of the present invention have been described as examples, it is apparent that modifications and adaptations will occur to those skilled in the art. However, it is to be expressly understood that such modifications and adaptations are within the spirit and scope of the present invention.

FIGURES

Figure 2:
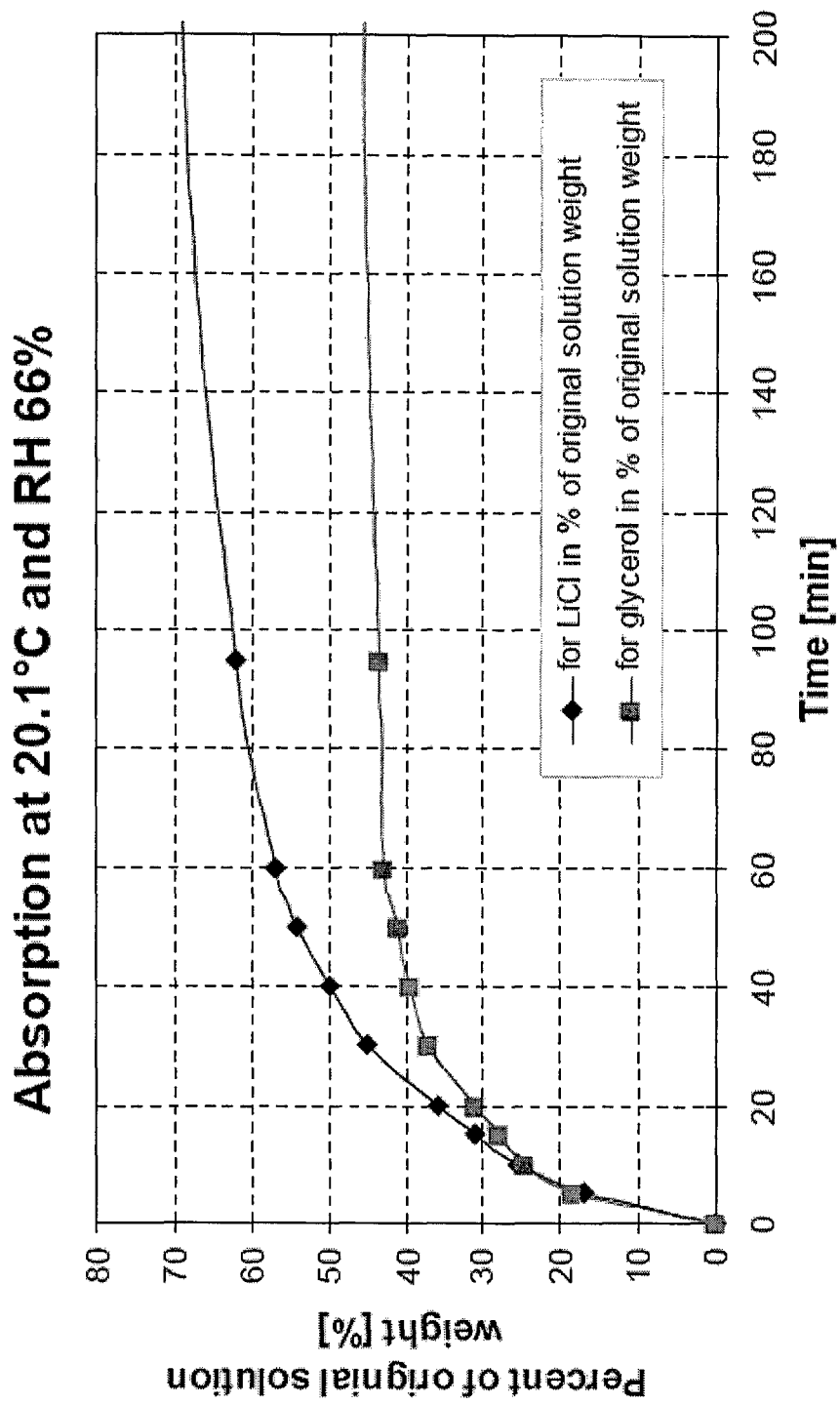
Figure 6:
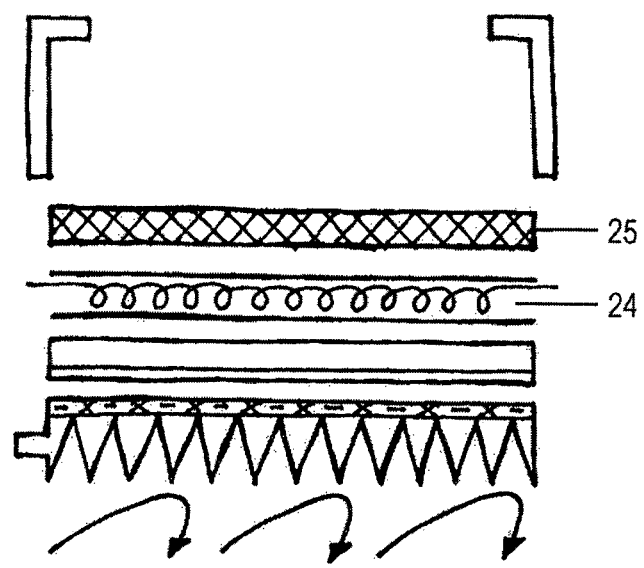

FIG. 1: Desorption of water from glycerol and from LiCl.
FIG. 2: Water uptake by glycerol and by LiCl.
FIG. 3: Water absorption setup example with a foldaway clothesline stand.
FIG. 4: Detail of a glycerol supply line.
FIG. 5: Illustration of a water recovery device using sunlight.
FIG. 6: Illustration of a water recovery device using a general heat source.
FIG. 7: Illustration of a complete water harvesting system according to the invention.
FIG. 8: Illustration of a compact water recovery module.
FIG. 9: Detail of flow channels in the water recovery module.
FIG. 10: Support construction for 48 modules.

The invention claimed is:

1. A structure, adapted for extracting water from air, comprising
    an absorbing part and a desorbing part, wherein
        said absorbing part comprises a surface having a thin layer of a flowing hygroscopic liquid in direct contact with air, the thin layer of hygroscopic liquid absorbing water vapor from air to form a hydrated solution;
        said desorbing part comprises a sandwich-like structure to separate water from the hygroscopic liquid in said hydrated solution,
        said sandwich-like structure including:
a) a heated sheet or layer, heated to a temperature above the environment's temperature;
b) a space or layer filled with porous or filamentary material, allowing the flow and substantially even distribution of hydrated solution along the heated layer;
c) a layer of material, allowing passage of water but preventing passage of the hygroscopic liquid;
d) a cooled sheet or layer, the temperature of which is decreased relative to the temperature of the heated sheet or layer, allowing water to be removed in liquid form.

2. The structure of claim 1, wherein the hygroscopic liquid is glycerol.

3. The structure of claim 1 or 2, wherein said hygroscopic liquid is distributed and allowed to flow by gravity through said porous or filamentary material.

4. The structure of claim 1, wherein energy needed for separation of water from the hygroscopic solution is obtained from solar radiation.

5. The structure according to claim 1, in which liquid flow occurs by pumping.

6. The structure according to claim 1, where the heated sheet or layer is made from a metal sheet or layer, and is heated by absorbing solar radiation.

7. The structure according to claim 1, wherein heat loss from the heated sheet or layer is reduced by one or more heat isolating, but only minimally light absorbing layers.

8. The structure according to claim 1, wherein the heated sheet or layer is isolated by sheets of transparent material, supported in a distance from 0.1 to 50 mm by isolating frames made of wood, foam polystyrene or other isolating materials or their combination.

9. The structure according to claim 1, wherein the layer of material allowing passage of water but preventing passage of the hygroscopic liquid is a membrane of hydrophobic or super hydrophobic material.

10. The structure according to claim 1, wherein the layer of material allowing passage of water but preventing passage of the hygroscopic liquid is made from regenerated cellulose or its derivates.

11. The structure according to claim 1, wherein the layer of material allowing passage of water but preventing passage of hydrated liquid is a porous PTFE membrane reinforced by suitable supporting material.

12. The structure according to claim 1, in which the heated sheet or layer and the cooled sheet or layer are provided with channels or grooves facilitating flow of the hydrated solution on a heated surface of the heated sheet or layer and removal of condensed water on a cooled surface of the cooled sheet or layer, while both liquids are separated by a layer of material allowing passage of water molecules but preventing passage of the hygroscopic liquid.

13. The structure according to claim 12, in which the sense of the grooves or channels between opposite surfaces is rotated, so that, after fixing them together, the mechanical stability of the structure is increased.

14. The structure according to claim 1, where the decrease of the temperature is provided by natural thermal air movement or wind and thermal radiation.

15. The structure according to claim 1, in which water vapor is extracted from air in closed spaces, which leads to a decrease of the relative humidity of the closed space.

16. The structure according to claim 15, where the water vapor extraction is combined with water evaporation from another water-wetted surface in a closed space, so that due to the evaporation heat of water, the resulting temperature in the same closed space is decreased.

17. The structure according to claim 1, further comprising irrigation tubes which are located at least 5 cm under a soil surface.

18. The structure according to claim 1, whereby the recovered water is disposed in proximity to a plant such that the water can be absorbed by said plant to facilitate plant growth.

19. The use of a structure according to claim 1 to produce water which can be used for one or more of
    a) drinking water;
    b) for the cultivation of plants; and
    c) soilless cultivation of plants.

* * * * *